United States Patent [19]

Sakuta et al.

[11] Patent Number: 4,508,572
[45] Date of Patent: Apr. 2, 1985

[54] CEMENT COMPOSITION FOR LAYING UNDERWATER

[75] Inventors: Masaharu Sakuta, Tokyo; Soichi Kiya, Hachioji; Iwao Uchizaki, Tokyo; Yasuhiko Yoshioka, Mitaka; Koichi Ito, Tokyo; Tadahiro Kaya, Kanagawa; Tsunetoshi Shioya; Yoshifumi Shimoyama, both of Fujisawa; Hiroyuki Yamakawa, Yamato, all of Japan

[73] Assignees: Takenaka Komuten Co., Ltd., Osaka; Takenaka Doboku Co., Ltd.; Sankyo Chemical Industries Ltd., both of Tokyo, all of Japan

[21] Appl. No.: 506,971

[22] Filed: Jun. 23, 1983

[30] Foreign Application Priority Data

Jul. 30, 1982 [JP]  Japan ................ 57-

[51] Int. Cl.$^3$ ............................................ C04B 7/02
[52] U.S. Cl. ...................................... 106/90; 106/314
[58] Field of Search ............................. 106/90, 314

[56] References Cited

U.S. PATENT DOCUMENTS

| | | | |
|---|---|---|---|
| 3,197,316 | 7/1965 | Beach | 106/90 |
| 3,216,966 | 11/1965 | Collins et al. | 106/90 X |
| 3,365,319 | 1/1968 | Link | 106/90 |
| 3,663,720 | 5/1972 | Thompson | 106/90 X |
| 3,864,290 | 2/1975 | Peppler et al. | 106/90 X |
| 3,937,633 | 2/1976 | Knight et al. | 106/90 |
| 3,944,515 | 3/1976 | Foley et al. | 106/90 X |
| 3,948,673 | 4/1976 | Chase et al. | 106/90 X |
| 4,028,125 | 6/1977 | Martin | 106/90 X |
| 4,070,331 | 1/1978 | Cottrell, Jr. | 106/90 X |
| 4,075,155 | 2/1978 | Philipps | 106/90 X |
| 4,082,563 | 4/1978 | Ellis et al. | 106/90 |
| 4,229,224 | 10/1980 | Dawson et al. | 106/90 |
| 4,247,334 | 1/1981 | Falcoz et al. | 106/90 |

*Primary Examiner*—G. L. Kaplan
*Assistant Examiner*—Nam X. Nguyen
*Attorney, Agent, or Firm*—Lowe, King, Price & Becker

[57] ABSTRACT

A cement composition is provided which has the property of being inseparable in water, having improved strength and no effect in delaying setting time or reducing strength. It is produced at a cheaper cost by reducing the amount of a polyacrylamide compound to a considerable great extent. The polyacrylamide compound is present in an amount of 0.1 to 3% by weight based on the weight of cement, when a dialdehyde is added thereto.

8 Claims, No Drawings

CEMENT COMPOSITION FOR LAYING UNDERWATER

BACKGROUND OF THE INVENTION

The present invention relates to a cement composition for laying underwater wherein a cement constituent thereof is not separated or washed away in water.

As concrete (containing mortar) is being laid under water (containing sea water and mud), the cement may become separated or washed away from a part of the aggregate or subjected to stirring effect upon contact with the water, either as the concrete mix is falling through the water or as the concrete mix is spreading in a widthwise direction under water. The part of the concrete mix upon contact with the water is reduced in strength, resulting in many defects as a concrete mix when laid under water.

As a concrete laying operation is performed under water (sea or river), the surrounding area is contaminated. Besides, a fishery compensation problem occurs and makes the concrete laying operation difficult to perform.

In order to prevent the cement from becoming separated from the concrete mix in water, a viscosity building agent or viscosity builder such as a polyacrylamide compound or the like may be mixed with an aggregate in an amount ranging from about 2% to about 5% by weight based on the cement content of the mix (referring to FIG. 1).

TABLE 1

| Chemical component of admixture | Amount of of admixture per 100 kg of cement (g) | Separation of cement (%) | Compressive strength of specimen at 28th day (kg/cm$^2$) Laid in air | Compressive strength of specimen at 28th day (kg/cm$^2$) Laid under water | Ratio of strength With ture Admixture (under water) Without admixture (in air) |
|---|---|---|---|---|---|
| — | 0 | 21.6 | 438 | 137 | 0.32 |
| Polyacrylonitrile | 2,000 | 6.8 | 173 | 103 | 0.24 |
| Polymethacrylate | 3,000 | 15.7 | 98 | 37 | 0.08 |
| Polyacrylic ester | 5,000 | 15.9 | 120 | 37 | 0.08 |

However, when this method is adopted, if the unit amount of cement is 400 kg/m$^3$, for example, the amount of viscosity builder to be used is 8 to 20 kg per 1 m$^3$ of the concrete mix. This means that the cost of the viscosity builder is equal to or more than the concrete mix itself. If the amount of the viscosity builder increases and the use of it becomes costly, the improvement in the performance of the viscosity builder by addition of such a viscosity builder does not allow actual adoption of this method.

Moreover, a concrete mix containing such a polymer viscosity builder tends to have a delayed setting time and to have a lower strength than a concrete mix containing no such agent. This drawback is the biggest obstacle in improving the performance of concrete laid under water by the use of a viscosity builder.

SUMMARY OF THE INVENTION

The present invention has been made in consideration of this, and has for its object to provide a cement composition which prevents disintegration of the concrete or mortar mix in water, by providing it with viscosity, and more particularly, wherein an amount of a polyacrylamide compound can be greatly decreased by the further addition of a dialdehyde as compared to the single addition of the polyacrylamide compound, while enhancing the effect of preventing disintegration in water; and which can be produced at a far cheaper cost than conventional cement compositions by addition of the dialdehyde, does not result in too great a reduction in concrete strength, and does not cause delay in concrete setting time as a result of the improvement in strength.

In order to achieve the above object, a water-inseparable cement composition according to the present invention provides the concrete mix with viscosity by mixing a polyacrylamide compound in the amount from 0.1 to 3% by weight based on the cement content of the mix. The cement composition enhances the property of preventing disintegration in water as well as further increases viscosity of concrete and improves its strength by addition of a dialdehyde.

DETAILED DESCRIPTION OF THE PREFERRED EMBODIMENTS

The polyacrylamide compound to be used for the present invention may include, for example, polyacrylamide, polymethacrylamide, partially Mannich-modified polyacrylamide or a copolymer of acrylamide or methacrylamide such as a copolymer thereof with a monomer selected from acrylic acid, methacrylic acid, sodium acrylate, vinylsulfonic acid, 2-acrylamide-2-methylpropanesulfonic acid, dimethylaminopropyl methacrylamide, dialkylaminoalkyl acrylate or its quaternary salt, dialkylaminoalkyl methacrylate or its quaternary salt, diallyldialkyl ammonium salt or other vinyl monomer. Among them, polyacrylamide, a copolymer of acrylamide with sodium acrylate, and a polyacrylamide partial hydrolysate are particularly useful.

There is a positive interrelation between a molecular weight of the polyacrylamide compound and a viscosity of its aqueous solution. In order to accomplish the object of the present invention, a polymer compound desirably has a molecular weight higher than one million, preferably higher than three million.

In order to provide a concrete or mortar mix having the property of being non-disintegrable in water, it is necessary to use the polyacrylamide compound in the amount of 0.1% by weight or higher with respect to the cement content of a concrete or mortar mix. Where the amount of the polyacrylamide compound exceeds 3% by weight, a concrete mix is rendered so viscous as to be difficult to handle and to have a delayed setting time.

The dialdehyde to be used for the present invention may include, for example, glyoxal, malonaldehyde, succinaldehyde, fumaraldehyde, malealdehyde, glutaraldehyde and adipaldehyde. A highly reactive glutaraldehyde is particularly useful.

The amount of the dialdehyde is determined so as to provide a concrete or mortar mix having the properties of not disintegrating in water and of retaining a flowability to an appropriate degree. The amount of the dialdehyde may be in the range from 0.1 to 20% by weight, preferably from 0.1 to 10% by weight, based on the amount of polyacrylamide compound added to the cement or mortar composition. The amount of the dialdehyde may wary with its kind.

The polyacrylamide compound may be used by mixing it with the cement in advance, by adding it to the concrete or mortar mix, or by adding a solution of it in water to the concrete or mortar mix. The mixing procedure may be decided depending upon the kind of polyacrylamide compound and by determining the easiest way possible for homogeneously mixing it into the concrete or mortar mix.

Similar results may be obtained according to the present invention in the case of a cement mortar which does not use a coarse aggregate.

EXAMPLE 1

A mortar mixer was filled with 520 g of cement and 130 g of water, and the mixture was mixed to give a cement paste having a water-cement ratio of 25%. To the resulting paste was added, in each case, a polyacrylamide partial hydrolysate in the amount of 0.1, 0.5 and 1.0% by weight based on the cement content, respectively, in the case of a 2% aqueous solution. The paste was then adjusted by the addition of water so as to attain a whole water-cement ratio of 65%. To this homogeneous paste was added 1,040 g of standard sand ("Toyoura"), and the resulting paste was mixed to give a homogeneously-mixed specimen mortar mix 1. The resulting specimen mortar mix 1 was filled into a cylindrical container having a diameter of 5 cm and a height of 5 cm and was then poured so that it fell by gravity from a position 10 cm above the water surface in a 1-liter volume measuring cylinder with 1 liter of water filled therein. The test results were obtained by measuring a turbidity of water by transmittance at a wavelength of 660 mμ with a photoelectric photometer.

To the rest of the mortar mix containing the polyacrylamide partial hydrolysate was added glutaraldehyde in the amounts of 0.5, 1.0 and 2.0% by weight based on the partial hydrolysate content, respectively, and the mixture was mixed in the same manner to produce a specimen mortar mix 2. The specimen mortar mix 2 was tested in the same manner as above, and the test results are shown in Tables 2 and 3 below.

TABLE 2

| | Test results of mortar specimen 1 | | |
|---|---|---|---|
| Viscosity builder | Amount of viscosity builder (% by weight) | Flow (cm) | Transmittance (%) |
| — | 0 | 26.0 | 4 |
| Polyacrylamide partial hydrolysate | 0.1 | 22.0 | 69 |
| | 0.5 | 20.0 | 85 |
| | 1.0 | 18.0 | 92 |

TABLE 3

| | Test results of mortar specimen 2 | | | |
|---|---|---|---|---|
| Viscosity builder | Amount of viscosity builder (% by wt.) based on the cement content | Amount of glutaraldehyde (% by wt.) based on the viscosity builder content | Flow (cm) | Transmittance (%) |
| Polyacrylamide partial hydrolysate | 0.5 | 0 | 20.0 | 85 |
| | | 1.0 | 18.5 | 92 |
| | | 2.0 | 17.0 | 98 |
| | 1.0 | 0 | 18.0 | 92 |
| | | 0.5 | 17.0 | 96 |
| | | 1.0 | 15.5 | 99 |

From the test results above, it was found that (a) the addition of the viscosity builder in the amount of 0.1% by weight or more based on cement content renders transmittance remarkably high. That is to say, when mortar is falling through water, an amount of cement separated from the mortar mix is reduced to a considerably small quantity. It is also found that (b) transmittance can be further improved by the addition of glutaraldehyde. It becomes apparent that the addition of glutaraldehyde merely in the amount of 2% with respect to the polyacrylamide partial hydrolysate content can reduce an amount of polyacrylamide partial hydrolysate required for attaining the same degree of transmittance as above to a half or less.

EXAMPLE 2

A concrete mix was produced in the same constituent proportions as shown in Table 4.

TABLE 4

| | | Unit amounts (kg/m³) | | | |
|---|---|---|---|---|---|
| Water-cement ratio (%) | Air content (%) | Water | Cement | Fine aggregate | Coarse aggregate |
| 50 | 1 | 200 | 400 | 692 | 1,055 |

To the above concrete mix was added a polyacrylamide partial hydrolysate in the amount of 0.1, 0.4, 0.6, 0.8, 1.5, 2.0 and 3.0% by weight, respectively, based on the cement content. This composition was mixed, and glutaraldehyde was added in an amount ranging from 0.1 to 20% by weight based on the polyacrylamide partial hydrolysate content to the concrete mix to give a specimen concrete mix 3. The specimen concrete mix 3 was tested in the same manner as in the case of the specimen mortar mixes and measured for a turbidity of water in the same manner as in Examples described above. The specimen concrete mix 3 was filled into a container in the form of a truncated cone having a bottom diameter of 5 cm, a top diameter of 7 cm and a depth of 8 cm. The specimen concrete mix 4 was poured so as to fall by gravity from the container from a position 10 cm above the water surface in a cylindrical container having a diameter of 20 cm and a depth of 26 cm with water filled to a depth of 16 cm therein. The turbidity of water was observed for measuring transmittance at a wavelength of 660 μm with a photoelectric photometer.

A cylindrical specimen 4 having a diameter of 15 cm and a height of 30 cm was also obtained from the specimen concrete mix 3. After being cured at 20° C. for 28 days in water, the specimens 4 were measured for compressive strength. The test results are shown in Table 5.

TABLE 5

| | Test results of concrete specimen 3 | | | |
|---|---|---|---|---|
| Amount of viscosity builder (% by wt.) based on the cement content | Amount of glutaraldehyde (% by wt.) based on the viscosity builder content | Transmittance (%) | Slump (cm) | Compressive strength (kg/cm²) |
| — | — | 3.0 | 22.0 | 342 |
| 0.1 | — | 34.0 | 21.0 | 358 |
| | 10 | 69.5 | 19.5 | 378 |
| | 20 | 85.0 | 18.5 | 380 |

TABLE 5-continued

Test results of concrete specimen 3

| Amount of viscosity builder (% by wt.) based on the cement content | Amount of glutar- aldehyde (% by wt.) based on the vis- cosity builder content | Transmit- tance (%) | Slump (cm) | Compressive strength (kg/cm$^2$) |
|---|---|---|---|---|
| 0.4 | — | 72.0 | 20.0 | 333 |
|  | 1.0 | 85.0 | 19.5 | 349 |
|  | 2.0 | 92.5 | 17.0 | 365 |
| 0.6 | — | 69.0 | 22.5 | 328 |
|  | 0.5 | 86.0 | 21.0 | 372 |
|  | 1.0 | 97.5 | 19.5 | 439 |
| 0.8 | — | 80.0 | 22.0 | 346 |
|  | 0.5 | 89.0 | 21.0 | 368 |
|  | 1.0 | 98.5 | 19.0 | 417 |
| 1.0 | — | 89.5 | 21.5 | 350 |
|  | 0.5 | 96.0 | 20.0 | 391 |
| 1.5 | — | 94.0 | 21.0 | 365 |
|  | 0.2 | 96.0 | 21.0 | 371 |
| 2.0 | — | 96.0 | 20.5 | 377 |
|  | 0.2 | 99.0 | 20.0 | 380 |
| 3.0 | — | 98.0 | 18.0 | 337 |
|  | 0.1 | 99.0 | 17.0 | 340 |

From the above test results, it was found that (a) the addition of glutaraldehyde improves transmittance to a considerable extent in the same manner as in the case of the above specimen mortar mix. It was also found that (b), in instances where transmittance is set to be 95%, although the single addition of the polyacrylamide partial hydrolysate requires 2.0% by weight or more based on the cement content, the use of glutaraldehyde in the amount of 1.0% by weight based on the polyacrylamide partial hydrolysate content can reduce an amount of the polyacrylamide partial hydrolysate required by 0.6% by weight, that is, to less than 1/3, based on the cement content. It was further found that (c) the addition of glutaraldehyde increases compressive strength.

What is claimed is:

1. A cement composition for laying underwater, comprising cement and a polyacrylamide compound, wherein said polyacrylamide compound is present in an amount ranging from 0.1 to 3% by weight of said cement, and a dialdehyde.

2. A cement composition for laying underwater according to claim 1, wherein said dialdehyde is present in amount from 0.1 to 20% by weight based on said polyacrylamide compound.

3. A cement composition for laying underwater according to claim 1, wherein said dialdehyde is glutaraldehyde and said dialdehyde is present in an amount from 0.1 to 10% by weight based on said polyacrylamide compound.

4. A cement composition for laying underwater according to claim 1, wherein said polyacrylamide compound is a member selected from the group consisting of polyacrylamide, polymethacrylamide, partially Mannich-modified polyacrylamide, a copolymer of acrylamide, a copolymer of methacrylamide and polyacrylamide partial hydrolysate.

5. A cement composition for laying underwater according to claim 4, wherein said copolymer is a copolymer with a monomer selected from the group consisting of sodium acrylate, acrylic acid, methacrylic acid, vinylsulfonic acid, 2-acrylamide-2-methylpropanesulfonic acid, dimethylaminopropyl methacrylamide, dialkylaminoalkyl acrylate and a quaternary salt thereof, dialkylaminoalkyl methacrylate and a quaternary salt thereof, diallyldialkyl ammonium salt and other vinyl monomers.

6. A cement composition for laying underwater according to claim 1, wherein said polyacrylamide compound has a molecular weight of at least one million.

7. A cement composition for laying underwater according to claim 1, wherein said polyacrylamide compound has a molecular weight of at least three million.

8. A cement composition for laying underwater according to claim 1, wherein said dialdehyde is a member selected from the group consisting of glyoxal, malonaldehyde, succinaldehyde, fumaraldehyde, malealdehyde, glutaraldehyde and adipaldehyde.

* * * * *

UNITED STATES PATENT AND TRADEMARK OFFICE
CERTIFICATE OF CORRECTION

PATENT NO. : 4,508,572
DATED : April 2, 1985
INVENTOR(S) : Masaharu SAKUTA et al It is certified that error appears in the above-identified patent and that said Letters Patent is hereby corrected as shown below:

Col. 1, Line 30, change "FIG. 1" to --Table 1--

Col. 1, in Table 1, change "Amount of of admixture per 100 kg of cement (g)" to --Amount of admixture per 100 kg of cement (g)--

Col. 1, in Table 1, change "Ratio of strength With ture Admixture (under water) Without admixture (in air)" to --Ratio of strength with admixture (under water) / Without admixture (in air)--

UNITED STATES PATENT AND TRADEMARK OFFICE
CERTIFICATE OF CORRECTION

PATENT NO. : 4,508,572

DATED : April 2, 1985

INVENTOR(S) : Masaharu SAKUTA et al

It is certified that error appears in the above-identified patent and that said Letters Patent is hereby corrected as shown below:

Col. 2, Line 33, change "2-acrylamide-2-" to --2-acrylamido-2--.

Col. 2, Line 68, change "wary" to --vary--

Col. 4, Line 41, change "4" to --3--

Col. 6, Line 25, change "2-acrylamine-2" to --2-acrylamido-2--

Signed and Sealed this

Third Day of September 1985

[SEAL]

Attest:

DONALD J. QUIGG

*Attesting Officer*  *Acting Commissioner of Patents and Trademarks - Designate*